(12) United States Patent
Rahman et al.

(10) Patent No.: US 9,013,229 B2
(45) Date of Patent: Apr. 21, 2015

(54) CHARGE PUMP CIRCUIT

(71) Applicant: Texas Instruments Incorporated, Dallas, TX (US)

(72) Inventors: Abidur Rahman, Richardson, TX (US); Jacob Wayne Day, Wylie, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/942,182

(22) Filed: Jul. 15, 2013

(65) Prior Publication Data

US 2015/0015323 A1 Jan. 15, 2015

(51) Int. Cl.
  *G05F 1/10* (2006.01)
  *H02M 3/07* (2006.01)

(52) U.S. Cl.
  CPC ..................................... *H02M 3/07* (2013.01)

(58) Field of Classification Search
  USPC .......................................................... 327/536
  See application file for complete search history.

(56) References Cited

U.S. PATENT DOCUMENTS

| 5,940,283 | A  | * | 8/1999 | Mihara et al. | 363/60 |
| 6,278,315 | B1 | * | 8/2001 | Kim | 327/536 |
| 6,781,440 | B2 | * | 8/2004 | Huang | 327/536 |
| 8,476,963 | B2 | * | 7/2013 | Cook et al. | 327/536 |

\* cited by examiner

*Primary Examiner* — Hai L Nguyen
(74) *Attorney, Agent, or Firm* — Alan A. R. Cooper; Frank D. Cimino

(57) ABSTRACT

A charge pump circuit includes a plurality of serially coupled stages and a plurality of clock drivers. A voltage output of a first of the stages is connected to a voltage input of a second of the stages. A voltage output of the second of the stages is boosted relative to a voltage input of the second of the stages. Each of the stages includes complementary charge pumps. Each of the charge pumps includes a pumping capacitor that stores charge in the stage. Each of the clock drivers drives a clock signal to the pumping capacitor of at least one of the stages. A voltage of the clock signal provided to the second of the stages is derived from the voltage input of the second of the stages.

18 Claims, 3 Drawing Sheets

CHARGE PUMP CIRCUIT

BACKGROUND

Many integrated circuits include on-chip circuitry to generate a voltage having a magnitude greater than and/or that is negative relative to a selected power supply voltage. Such voltage may be used to power portions of the circuitry contained on the integrated circuit. For example, semiconductor memories, such as FLASH or EEPROM memories, may require write and/or erase voltages that are higher than the voltage needed to power the remainder of the circuitry included on the integrated circuit.

Charge pumps are one class of such voltage boosting and/or inverting circuits. Charge pumps are generally implemented as capacitive voltage multiplier circuits. Charge pumps use switch isolated capacitors to convert an input voltage to an output voltage that may be higher than, or negative relative to, the input voltage. In a charge pump, the switches coupled to a capacitor are operated in sequence to first charge the capacitor from the input voltage and then transfer the charge to the output. A charge pump circuit may include a number of stages, each of which may boost or negate the voltage output by the previous stage.

SUMMARY

A charge pump circuit having a reduced number of stages, and a technique to reduce the voltage across the pumping capacitors is disclosed herein. In one embodiment, a charge pump circuit includes a plurality of serially coupled stages and a plurality of clock drivers. A voltage output of a first of the stages is connected to a voltage input of a second of the stages. A voltage output of the second of the stages is boosted relative to a voltage input of the second of the stages. Each of the stages includes complementary charge pumps. Each of the charge pumps includes a pumping capacitor that stores charge in the stage. Each of the clock drivers drives a clock signal to the pumping capacitor of at least one of the stages. A voltage of the clock signal provided to the second of the stages is derived from the voltage input of the second of the stages.

In another embodiment, a capacitive voltage converter includes a first charge pump, a second charge pump, and a clock driver. The second charge pump is coupled to the first charge pump, and is configured to boost a voltage output of the first charge pump. The clock driver is coupled to the second charge pump, and is configured to generate a clock signal based on the voltage output of the first charge pump. The second charge pump boosts the voltage output of the first charge pump in accordance with the clock signal voltage.

In a further embodiment, a voltage boosting apparatus includes three sequentially coupled charge pump stages, a first clock driver, and a second clock driver. Each of the stages includes a first charge pump and a second charge pump. Each of the charge pumps includes a pair of complementary transistors, and a pumping capacitor coupled to a drain of each of the transistors. A base of each transistor of the first charge pump is coupled to a drain of each transistor of the second charge pump. The first clock driver provides a clock signal having first phase to the pumping capacitor of the first charge pump of the first of the sequentially coupled stages, and provides a clock signal having second phase to the pumping capacitor of the second charge pump of the first of the sequentially coupled stages. The second clock driver provides a clock signal having first phase to the pumping capacitor of the first charge pump of the second of the sequentially coupled stages, and provides a clock signal having second phase to the pumping capacitor of the second charge pump of the second of the sequentially coupled stages. A voltage output of the first of the sequentially coupled stages powers the second clock driver, and the clock signal provided by the second clock driver has greater voltage swing than the clock signal provided by the first clock driver.

BRIEF DESCRIPTION OF THE DRAWINGS

For a detailed description of various examples, reference will now be made to the accompanying drawings in which.

NOTATION AND NOMENCLATURE

Figure 1:
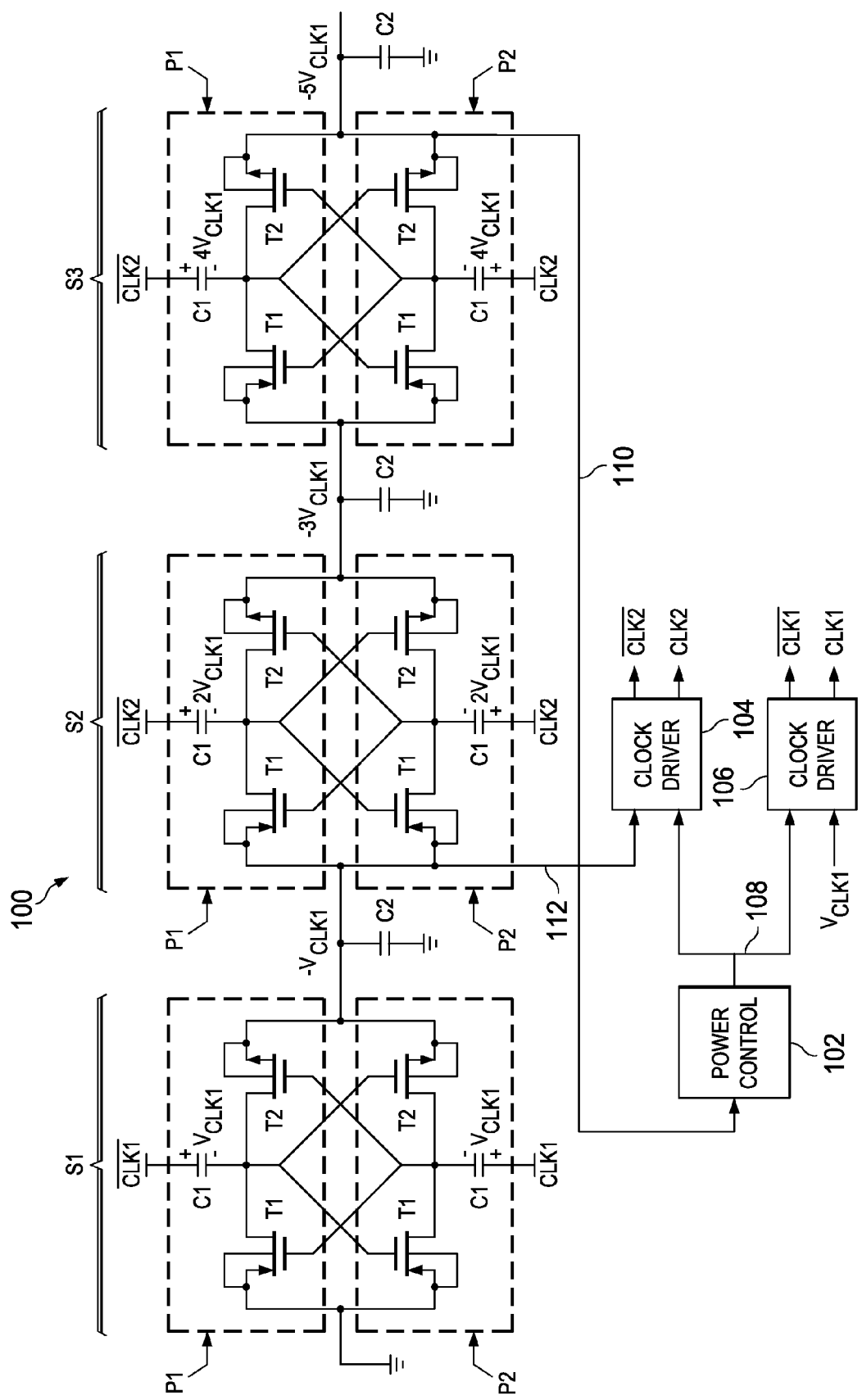
FIG. 1 shows a schematic diagram of a charge pump circuit in accordance with principles disclosed herein.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The recitation "based on" is intended to mean "based at least in part on." Therefore, if X is based on Y, X may be based on Y and any number of other factors. The term "approximately" means within plus or minus 10 percent of a stated value.

DETAILED DESCRIPTION

The following discussion is directed to various implementations of the invention. Although one or more of these implementations may be preferred, the implementations disclosed should not be interpreted, or otherwise used, as limiting the scope of the disclosure, including the claims. In addition, one skilled in the art will understand that the following description has broad application, and the discussion of any implementation is meant only to be exemplary of that implementation, and not intended to intimate that the scope of the disclosure, including the claims, is limited to that implementation.

In conventional multi-stage charge pump circuits, all the stages operate based on a common power supply voltage. Consequently, each stage may boost the output voltage of the previous stage by no more than the common power supply voltage. For example, a conventional voltage quintupler requires four stages, and conventional inverting voltage quintupler requires five stages. While such circuits provide effective voltage conversion, they are not without shortcomings. For example, the cost of the circuit increases with the number of stages, and therefore increases in proportion to the boost applied by the circuit. Furthermore, semiconductor processes may restrict the voltage applied to a component, such as a capacitor or switching transistor. For example, in a conventional five stage inverting voltage quintupler, the voltage applied to a capacitor may be five times the input power supply voltage. If standard components produced using a semiconductor process are unable to operate reliably at such voltages, then larger and more expensive high-voltage components must be employed in the circuit.

The novel charge pump circuit disclosed herein employs a reduced number of stages to produce a desired output voltage. For example, rather than five stages, an inverting voltage quintupler in accordance with principles disclosed herein may include only three stages. By decreasing the number of stages, the cost of the charge pump circuit is reduced. Additionally, the reduced number of stages decreases the time required for the output of the circuit to reach the desired voltage (i.e., decreased startup time). Furthermore, voltage across the components of the circuit is advantageously reduced, which enables generation of higher voltages without addition of high voltage components. For example, a three stage inverting voltage quintupler as disclosed herein may apply a maximum of four times the input power supply voltage to the capacitors of the circuit, rather than the five times present in the conventional circuit. By use of low voltage rather than high voltage components, the die size of the charge pump can be substantially reduced.

FIG. 1 shows a schematic diagram of a charge pump circuit 100 in accordance with principles disclosed herein. The charge pump circuit 100 is an inverting voltage quintupler. However, the principles disclosed herein are applicable to a wide range charge pump voltage boosters and inverters. The charge pump circuit 100 includes three sequentially coupled stages S1, S2, and S3. Each stage S1, S2, S3 includes complementary charge pumps P1 and P2. In the circuit 100, stage S1 is a voltage inverter, and stages S2 and S3 are voltage boosters. The charge pump circuit 100 also includes clock drivers 104 and 106, and may include power control circuitry 102. The clock drivers 104, 106 provide clock signals to the stages S1, S2, and S3. The power control circuitry 102 monitors the output voltage 110 of stage S3 and controls generation of clock signal 108 based on the output voltage 110. Other implementations of the charge pump circuit 100 may include a different number of stages, a different number of charge pumps per stage, etc.

Each of the charge pumps P1 and P2 includes a pumping capacitor C1 and transistors T1 and T2 that operate as switches to control flow of charge to and from the pumping capacitor C1. T1 may be an N-channel metal oxide semiconductor (NMOS) transistor, and T2 may be a P-channel MOS (PMOS) transistor. Charge is provided to the pumping capacitor C1 through transistor T1, and provided, via the transistor T2, from the pumping capacitor P1 to capacitor C2 and a subsequent stage S2, S3.

In each charge pump P1, P2 the source of transistor T1 is coupled to the input of the charge pump and the drain of transistor T1 is coupled to the pumping capacitor C1. The drain of transistor T2 is coupled to the pumping capacitor C1, and the source of transistor T2 is coupled to the output of the charge pump. The gate of each transistor T1, T2 is coupled to a clock signal through the pumping capacitor C1 of the complementary charge pump. That is, the gates of transistors T1, T2 of charge pump P1 are coupled to a clock signal through capacitor C1 of charge pump P2, and the gates of transistors T1, T2 of charge pump P2 are coupled to a clock signal through capacitor C1 of charge pump P1.

The pumping capacitors C1 of charge pumps P1 and P2 are driven by clock signals of opposite phase. That is, the clock signal driving capacitor C1 of charge pump P1 is inverted relative to the clock signal driving capacitor C1 of charge pump P2. This arrangement causes the charge pumps P1, P2 to charge the capacitor C1 and allow charge to flow from the capacitor C1 to the capacitor C2 on opposing phases of the clock signal. Accordingly, charge pump P1 is charging while charge pump P2 is providing charge to output capacitor C2, and vice versa. The difference in voltage of the clock signal driving the pumping capacitor C1, between charging and output, produces the boost or inversion of voltage at the output capacitor C2.

The charge pump circuit 100 includes clock drivers 104 and 106 that provide the clock signals to the stages S1, S2, S3. In the system 100, the clock driver 106 provides clock signals to stage S1, and clock driver 104 provides clock signals to stages S2 and S3. In some implementations, clock drivers may be coupled to the stages differently, or a different clock driver may drive each stage. For example, stage S3 may be driven by clock driver that generates a clock signal based on the voltage output of stage S2.

The clock driver 104 provides clock signals having a different voltage swing than the clock signals provided by the clock driver 106. The clock driver 104 is coupled to the voltage output 112 of the stage S1, and applies voltage output of the stage S1 to produce the clock signal CLK2. Thus, while CLK1 provided by the clock driver 106 may, for example, swing between ground and a first voltage, the CLK2 signal may swing from the first voltage to voltage at the output of stage S1. If CLK1 swings from ground to $V_{CLK1}$, then CLK2 may swing from $-V_{CLK1}$ to $V_{CLK1}$, providing double the voltage swing of CLK1. Accordingly, in each of the boost stages S2, S3, the voltage at the input of the stage is boosted in accordance with the CLK2 voltage swing (e.g., $2V_{CLK1}$). Thus, in the implementation of the system 100 shown in FIG. 1, the output of stage S1 is $-V_{CLK1}$, the output of stage S2 is $-3V_{CLK1}$, and the output of stage 3 is $-5V_{CLK1}$.

FIG. 1 also shows the voltage across each of the pumping capacitors C1. In stage S3, the voltage across the pumping capacitors C1 is no more than $4V_{CLK1}$. Thus, the charge pump circuit 100 produces $-5V_{CLK1}$ while the voltage across the pumping capacitors C1 is no more than $4V_{CLK1}$ and the voltage across the transistors T1 and T2 is no more than $2V_{CLK1}$.

Figure 2:
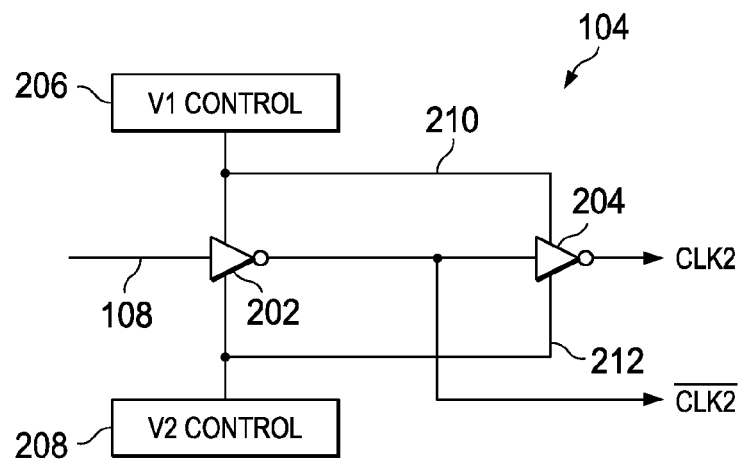
FIG. 2 shows a schematic diagram of a clock driver circuit for a charge pump in accordance with principles disclosed herein.

FIG. 2 shows a schematic diagram of a clock driver circuit 104 in accordance with principles disclosed herein. The circuitry of FIG. 2 may also be applied to the clock driver 106. The clock driver 104 includes drivers 202 and 204 that generate the complementary clock signals CLK2 and $\overline{CLK2}$. The voltages applied by the drivers 202 and 204 are provided by V1 control circuitry 206 and V2 control circuitry 208. In some implementations of the driver circuit 104, the V1 control circuitry 206 may connect the drivers 202, 204 to a voltage provided by a power supply (e.g., a positive power rail voltage). In other implementations, the V1 control circuitry 206 may connect the drivers 202, 204 to another voltage, such as a stage S1 output voltage, a voltage generated from the stage S1 output voltage or a power supply voltage, etc.

Similarly, in some implementations of the driver circuit 104, the V2 control circuitry 208 may connect the drivers 202, 204 to a voltage provided by a power supply (e.g., ground). In other implementations, the V2 control circuitry 208 may connect the drivers 202, 204 to another voltage, such as a stage S1 output voltage (e.g., $-V_{CLK1}$), a voltage generated from the stage S1 output voltage or a power supply voltage, etc.

In the inverting quintupler of FIG. 1, with respect to the clock driver 106, the V1 control circuitry 206 connects the drivers 202, 204 to a positive power supply voltage (e.g., $V_{DD}$), and V2 control circuitry 208 connects the drivers 202, 204 to a reference voltage, such as a ground voltage. With respect to the clock driver 104, the V1 control circuitry 206 connects the drivers 202, 204 to the positive power supply voltage (e.g., $V_{DD}$), and V2 control circuitry 208 connects the drivers 202, 204 to the stage S1 output voltage $-V_{CLK1}$.

The voltages provided to the drivers 202, 204 may be different from those described above in some implementations of the charge pump 100. For example in a non-inverting booster, with respect to the clock driver 104, the V1 control circuitry 206 may connect the drivers 202, 204 to the stage S1 output voltage, and V2 control circuitry 208 may connect the drivers 202, 204 to a ground voltage.

Figure 3:
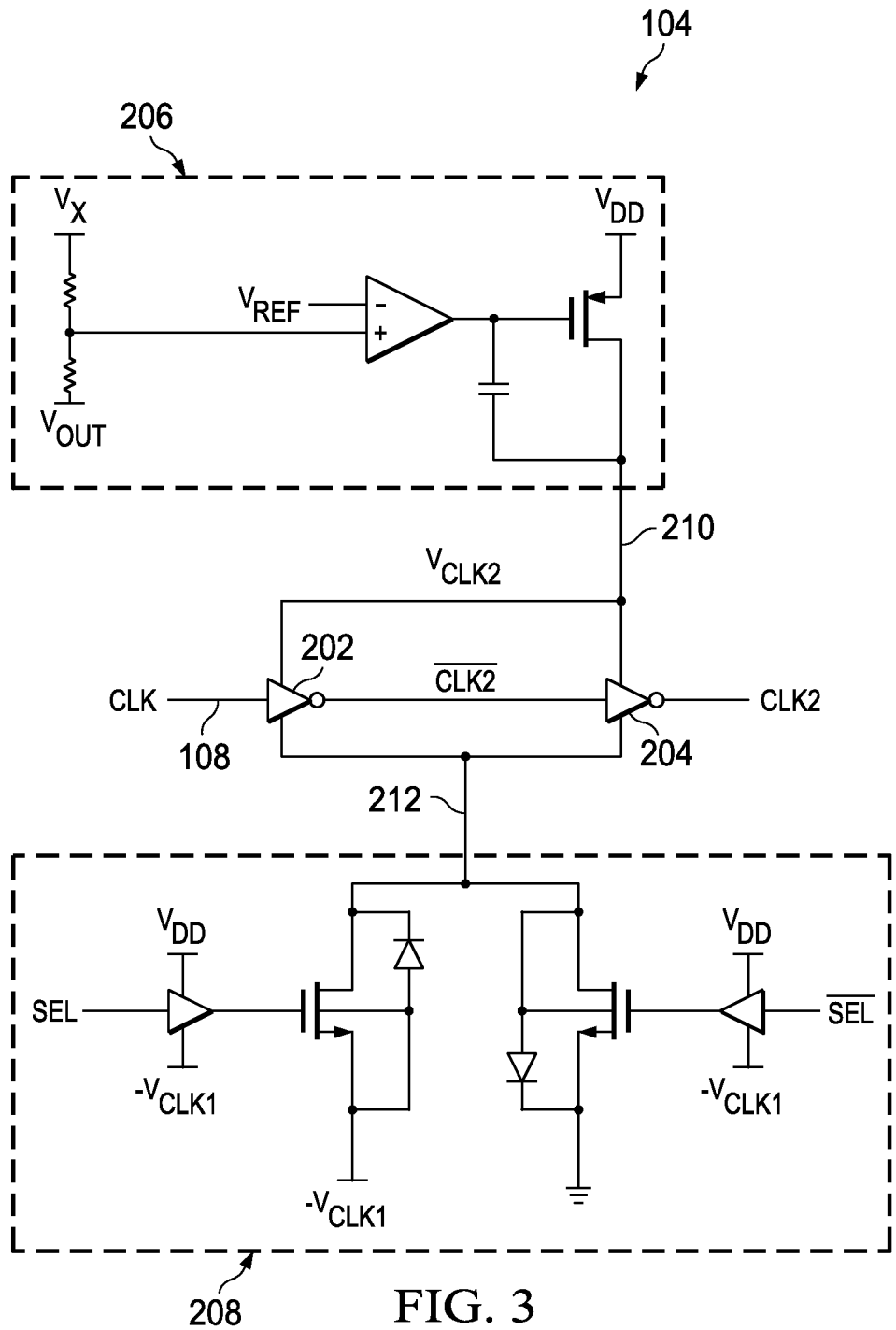
FIG. 3 shows a schematic diagram of a clock driver circuit that includes regulation and power supply selection in accordance with principles disclosed herein.

FIG. 3 shows a schematic diagram of an implementation of the clock driver circuit 104 that includes regulation and power supply selection in accordance with principles disclosed herein. The clock driver 104 of FIG. 3 allows for adjustment of the output voltage 110 such that the output voltage 110 of the charge pump circuit 100 is not limited to integer multiples (or particular integer multiples) of a power supply voltage. The V1 control circuitry 206 regulates the voltage 210 provided to the drivers 202, 204 for generation of the clock signal CLK2. Regulating voltage 210 changes the amount of voltage added at each stage driven by CLK2 (e.g., stages S2, S3). This allows, for example, a negative charge pump as shown in FIG. 1, to generate a voltage from 0 to −5 times the power supply voltage ($V_{DD}$).

The V2 control circuitry 208 of FIG. 3 allows for selection of the second voltage 212 (i.e., the reference or negative voltage) provided to the drivers 202, 204. In the implementation of FIG. 3, ground or the output 112 of stage S1 ($-V_{CLK1}$) may be selected via the signal SEL. When ground is selected, each stage of the charge pump driven by CLK2 boosts the stage input voltage by, for example, voltage 210. When $-V_{CLK1}$ is selected, each stage of the charge pump driven by CLK2 boosts the stage input voltage by, for example, the voltage differential of voltage 210 and $-V_{CLK1}$.

Equation 1 gives the exemplary output voltage 110 of the charge pump circuit 100 when SEL is asserted and stages S2 and S3 boost by $2V_{CLK1}$.

$$V_{OUT} = -V_{CLK1} - (V_{CLK2} + V_{CLK1}) - (V_{CLK2} + V_{CLK1}) = -3V_{CLK1} - 2V_{CLK2} \quad (1)$$

Equation 2 gives the exemplary output voltage 110 of the charge pump circuit 100 when SEL is negated and stages S2 and S3 boost by $V_{CLK1}$.

$$V_{OUT} = -V_{CLK1} - V_{CLK2} - V_{CLK2} = -V_{CLK1} - 2V_{CLK2} \quad (2)$$

An instance of the driver circuitry 104 of FIG. 3 may be applied to each of stages S2 and S3 to produce a variety of different voltages (e.g., any voltage between 0 and $-5V_{DD}$). Varying the boost voltages in this fashion advantageously allows all capacitance of the circuit 100 to be utilized while varying the output voltage 110. Conventional approaches vary output voltage by selecting an intermediate stage to provide circuit output voltage, thereby losing the benefit of the capacitances of subsequent stages. In contrast, the charge pump 100 including clock drivers 104, 106 can take advantage of all the stage output capacitors C2 present in the charge pump circuit and provide increased load driving capacity at any provided output voltage.

Figure 4:
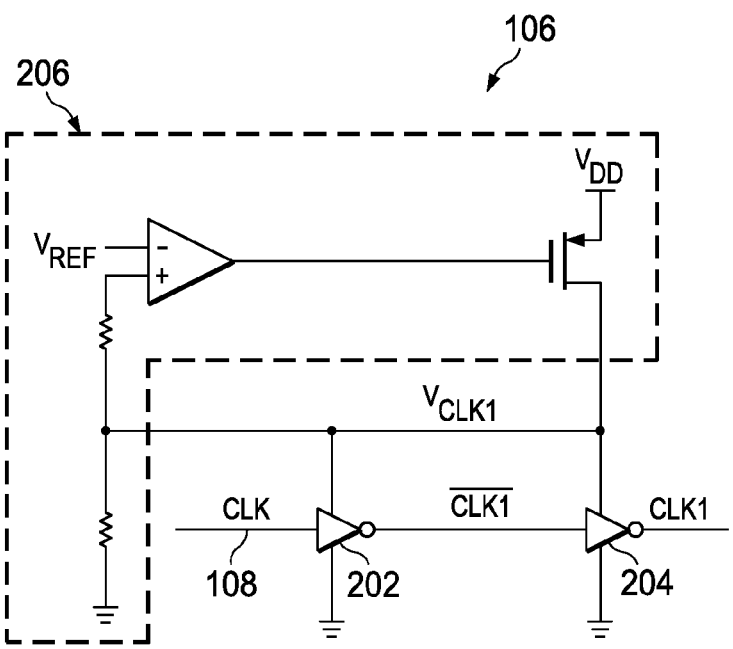
FIG. 4 shows a schematic diagram of a clock driver circuit for a charge pump that includes regulation in accordance with principles disclosed herein.

FIG. 4 shows a schematic diagram of a clock driver circuit 106 that includes regulation in accordance with principles disclosed herein. Regulation is provided by the V1 control circuit 206. The regulation may provide control over biasing of transistors T1, T2 in the charge pump circuit 100, and provide regulation of the output voltage 110 of stage S3.

Figure 5:
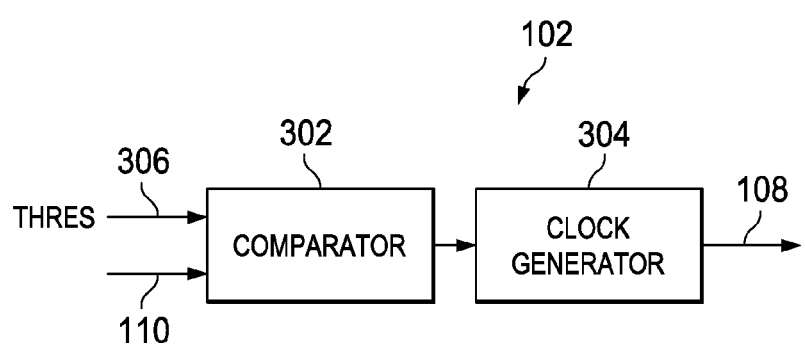
FIG. 5 shows a block diagram of a power controller for a charge pump circuit in accordance with principles disclosed herein.

FIG. 5 shows a block diagram of the power control circuit 102 in accordance with principles disclosed herein. The power control circuit 102 reduces power consumption of the charge pump circuit 100 by disabling clock generation when the output voltage 110 of the charge pump 110 is within a predetermined operational range. The power control circuit 102 includes a comparator 302 and a clock generator 304. The clock generator 304 may include an oscillator, frequency divider circuitry, etc. for generating the clock signal 108 that is provided to the clock drivers 104, 106.

The comparator 302 is coupled to the output of stage S3 and monitors the output voltage 110 generated by stage S3. The comparator 302 compares the output voltage 110 to a threshold voltage value 306. If the output voltage 110 is less than the threshold value 306, then the comparator 302 signals the clock generator 304 to provide clocks to the clock drivers 104, 106, which in turn drive the stages S1, S2, S3 and boost the output voltage 110. When the output voltage 110 exceeds the threshold voltage value 306, the comparator 302 signals the clock generator 304 to disable provision of clocks to the clock drivers 104, 106.

Thus, the power consumed by the charge pump circuit 100 is reduced by clocking the stages S1, S2, S3 only when the output voltage falls below the threshold value. In low-power systems and/or systems that intermittently consume power from the charge pump circuit 100, the power control circuit 102 can substantially reduce the power consumed by the charge pump circuit 100.

The above discussion is meant to be illustrative of the principles and various implementations of the present disclosure. Numerous variations and modifications will become apparent to those skilled in the art once the above disclosure is fully appreciated. For example, while the principles disclosed herein have been explained by way of a three stage negative charge pump circuit, those skilled in the art will understand that the principles disclosed are applicable to positive or negative charge pumps including various numbers of stages. It is intended that the following claims be interpreted to embrace all such variations and modifications.

What is claimed is:

1. A charge pump circuit, comprising:
   a plurality of three or more serially coupled stages, wherein a voltage output of a first of the stages is connected to a voltage input of a second of the stages, and a voltage output of the second of the stages is boosted relative to a voltage input of the third of the stages, each of the stages comprising:
   complementary charge pumps, each of the charge pumps comprising:
   a pumping capacitor that stores charge in the stage; and
   a plurality of at least a first and second clock drivers, wherein each of the first and second clock drivers drives a first clock signal and a second clock signal, respectively, to the pumping capacitor of at least one of the stages, and wherein a voltage of the second clock signal provided to the second of the stages is derived from the voltage input of the second of the stages, and
   wherein each of the plurality of clock drivers each contain a first control circuitry and a second control circuitry, that is employed to provide an upper and lower bound of a voltage value of the first clock signal and a second clock, wherein at least one upper or lower bound is determined from a voltage across at least one capacitor of the charge pump circuit.

2. The charge pump circuit of claim 1, wherein the plurality of stages comprises no more than three stages, and a voltage output of a third of the stages is boosted by approximately a factor of five relative to the voltage output of the first of the stages.

3. The charge pump circuit of claim 1, wherein the stages combine to boost voltage output by approximately a factor of at least five, and voltage across the pumping capacitor of none of the stages exceeds four times a voltage of the clock signal driving the first of the stages.

4. The charge pump circuit of claim 1, wherein at least one of the clock drivers comprises regulation circuitry that controls voltage of the clock signal, the regulation circuitry configured to adjust a voltage provided to the clock driver.

5. The charge pump circuit of claim 4, wherein the regulation circuitry is configured to adjust an upper of two power supply voltages provided to the clock driver.

6. The charge pump circuit of claim 1, further comprising a power control circuitry configured to means for:
monitoring a voltage output of a final of the stages;
disabling provision of clock signals to the stages based on the voltage output of the final of the stages being within a predetermined range;
enabling provision of clock signals to the stages based on the voltage output of the final of the stages being outside the predetermined range.

7. A capacitive voltage converter, comprising:
a first charge pump; and
a second charge pump coupled to the first charge pump, and configured to boost a voltage output of the first charge pump;
a clock driver coupled to the second charge pump, and configured to generate a clock signal based on the voltage output of the first charge pump;
wherein the plurality of clock driver contains a first control circuitry and a second control circuitry, that is employed to provide an upper and lower bound of a voltage value of the clock signal
wherein at least one upper or lower bound is determined from a voltage across at least one capacitor of the capacitive voltage converter, and
wherein the second charge pump boosts the voltage output of the first charge pump in accordance with the clock signal voltage.

8. The capacitive voltage converter of claim 7, further comprising:
a comparator configured to compare an output voltage of the capacitive voltage converter to a predetermined charge pump threshold voltage; and
clock circuitry configured to:
enable provision of clock signals to the charge pumps based on the output voltage being less than the predetermined charge pump threshold voltage; and
disable provision of clock signals to the charge pumps based on the output voltage being not less than the predetermined charge pump threshold voltage.

9. The capacitive voltage converter of claim 7, wherein the second charge pump is configured to approximately triple the voltage output of the first charge pump.

10. The capacitive voltage converter of claim 7, further comprising:
a third charge pump coupled to the second charge pump, and configured to boost a voltage output of the second charge pump; wherein the third charge pump is configured to approximately quintuple the voltage output of the first charge pump.

11. The capacitive voltage converter of claim 10, wherein each of the charge pumps comprises a pumping capacitor, and voltage across the pumping capacitor of none of the charge pumps exceeds four times a voltage of the clock signal driving the first charge pump.

12. The capacitive voltage converter of claim 7, wherein the clock driver comprises regulation circuitry that controls voltage of the clock signal, the regulation circuitry configured to adjust a voltage provided to the clock driver.

13. The capacitive voltage converter of claim 12, wherein the regulation circuitry is configured to adjust an upper of two voltages provided to the clock driver.

14. A voltage boosting apparatus, comprising:
three sequentially coupled charge pump stages, each of the stages comprising:
a first charge pump and a second charge pump, each of the charge pumps comprising:
a pair of complementary transistors; and
a pumping capacitor coupled to a drain of each of the transistors;
wherein a base of each transistor of the first charge pump is coupled to a drain of each transistor of the second charge pump;
a first clock driver that provides a first clock signal having a first phase to the pumping capacitor of the first charge pump of the first of the sequentially coupled stages, and provides the first clock signal having a second phase to the pumping capacitor of the second charge pump of the first of the sequentially coupled stages; and
a second clock driver that provides a second clock signal having a first phase to the pumping capacitor of the first charge pump of the second of the sequentially coupled stages, and provides the second clock signal having the second phase to the pumping capacitor of the second charge pump of the second of the sequentially coupled stages;
wherein each of the plurality of clock drivers each contain a first control circuitry and a second control circuitry, that is employed to provide an upper and lower bound of a voltage value of the first clock signal and a second clock,
wherein at least one upper or lower bound is determined from a voltage across at least one capacitor of the charge pump circuit, and
wherein a voltage output of the first of the sequentially coupled stages powers the second clock driver, and the clock signal provided by the second clock driver has greater voltage swing than the clock signal provided by the first clock driver.

15. The voltage boosting apparatus of claim 14, wherein the second clock driver circuit further comprises regulation circuitry that controls voltage of the second clock signal provided by the second clock driver, the regulation circuitry configured to adjust a supply voltage provided to the clock driver.

16. The voltage boosting apparatus of claim 14, further comprising:
a comparator configured to compare an output voltage of the third of the sequentially coupled stages to a predetermined charge pump threshold voltage;
clock control circuitry configured to:
enable provision of the first and second clock signals to the sequentially coupled stages based on the output voltage being less than the predetermined charge pump threshold voltage; and disable provision of the first and second clock signals to the sequentially coupled stages based on the output voltage being not less than the predetermined charge pump threshold voltage.

17. The voltage boosting apparatus of claim 16, wherein the output voltage of the third of the sequentially coupled stages is boosted by approximately a factor of five relative magnitude of the voltage swing of the first clock signal provided by the first clock driver.

18. The voltage boosting apparatus of claim 14, wherein the phase of the first phase is substantially the same of the first phase of the second clock signal, and wherein the second phase of the first clock signal is substantially the same as the phase of the second clock signal.

* * * * *